(12) United States Patent
Maehara et al.

(10) Patent No.: US 9,013,852 B2
(45) Date of Patent: Apr. 21, 2015

(54) BREAKER-PHASE-CONTROL SWITCHING SYSTEM AND CIRCUIT-BREAKER CONTROL UNIT

(71) Applicant: Kabushiki Kaisha Toshiba, Minato-ku, Tokyo (JP)

(72) Inventors: Hiroyuki Maehara, Fuchu (JP); Tomonori Nishida, Kawasaki (JP); Shigeki Katayama, Kunitachi (JP); Minoru Saitoh, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 107 days.

(21) Appl. No.: 13/857,083

(22) Filed: Apr. 4, 2013

(65) Prior Publication Data

US 2013/0222963 A1    Aug. 29, 2013

Related U.S. Application Data

(63) Continuation of application No. PCT/JP2011/072873, filed on Oct. 4, 2011.

(30) Foreign Application Priority Data

Oct. 7, 2010 (JP) ................................. 2010-227985

(51) Int. Cl.
*H02H 3/093* (2006.01)
*H02H 3/26* (2006.01)
*H01H 9/54* (2006.01)
(Continued)

(52) U.S. Cl.
CPC ................ *H02H 3/265* (2013.01); *H01H 9/54* (2013.01); *H01H 33/59* (2013.01); *H02H 1/0061* (2013.01)

(58) Field of Classification Search
USPC .......................................................... 361/115
See application file for complete search history.

(56) References Cited

U.S. PATENT DOCUMENTS

| 4,922,363 A | * | 5/1990 | Long et al. | ...................... 361/3 |
| 5,185,705 A | * | 2/1993 | Farrington | .................... 700/292 |

(Continued)

FOREIGN PATENT DOCUMENTS

| CN | 1199211 A | 11/1998 |
| CN | 1228899 A | 9/1999 |

(Continued)

OTHER PUBLICATIONS

Chinese Office Action dated Sep. 26, 2014, issued in counterpart Chinese Application No. 201180040518.2.

(Continued)

*Primary Examiner* — Ronald W Leja
(74) *Attorney, Agent, or Firm* — Holtz, Holtz, Goodman & Chick PC

(57) ABSTRACT

According to one embodiment, there is provided a breaker-phase-control switching system including a merging unit, a superordinate unit, and a circuit-breaker control unit. The circuit-breaker control unit includes a waveform-zero-point-calculation processing unit configured to calculate a current phase, based on absolute time kept by an internal clock and waveform data, and a predicted-breaker-operating-time-calculation processing unit configured to predict a predicted operating time. Further, a command-output-timing-determination processing unit is included which determines a timing for electrically conducting a coil from the absolute time, a preset target phase, a current phase, and a predicted operating time.

21 Claims, 8 Drawing Sheets

(51) Int. Cl.
*H01H 33/59* (2006.01)
*H02H 1/00* (2006.01)

(56) References Cited

U.S. PATENT DOCUMENTS

| | | | |
|---|---|---|---|
| 6,172,863 B1 | 1/2001 | Ito et al. | |
| 8,817,444 B2 * | 8/2014 | Bjorklund | 361/115 |
| 8,902,558 B2 * | 12/2014 | Menezes et al. | 361/115 |
| 2002/0116092 A1 | 8/2002 | Hamamatsu et al. | |
| 2010/0254060 A1 * | 10/2010 | Saito et al. | 361/115 |
| 2012/0143535 A1 | 6/2012 | Maehara et al. | |
| 2013/0222963 A1 * | 8/2013 | Maehara et al. | 361/115 |
| 2014/0002944 A1 * | 1/2014 | Menezes et al. | 361/160 |

FOREIGN PATENT DOCUMENTS

| | | |
|---|---|---|
| CN | 1747372 A | 3/2006 |
| JP | 10-191473 A | 7/1998 |
| JP | 2000-188044 A | 7/2000 |
| JP | 2004-282856 A | 10/2004 |
| JP | 2006-080994 A | 3/2006 |
| JP | 3907998 B2 | 4/2007 |
| JP | 2007-288921 A | 11/2007 |

OTHER PUBLICATIONS

International Preliminary Report on Patentability (in English); dated Apr. 25, 2013; issued in International application No. PCT/JP2011/072873.

* cited by examiner

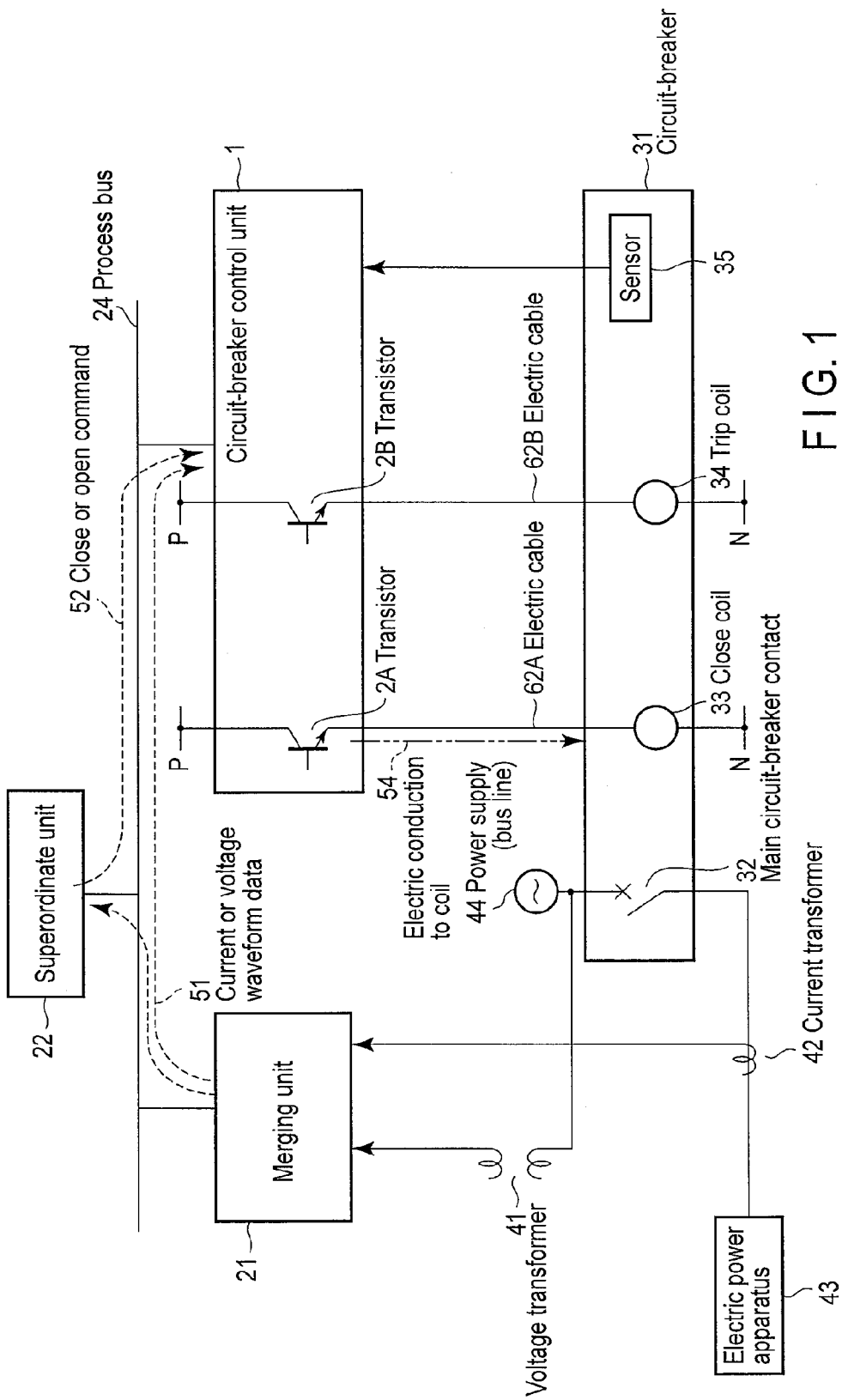
F I G. 1

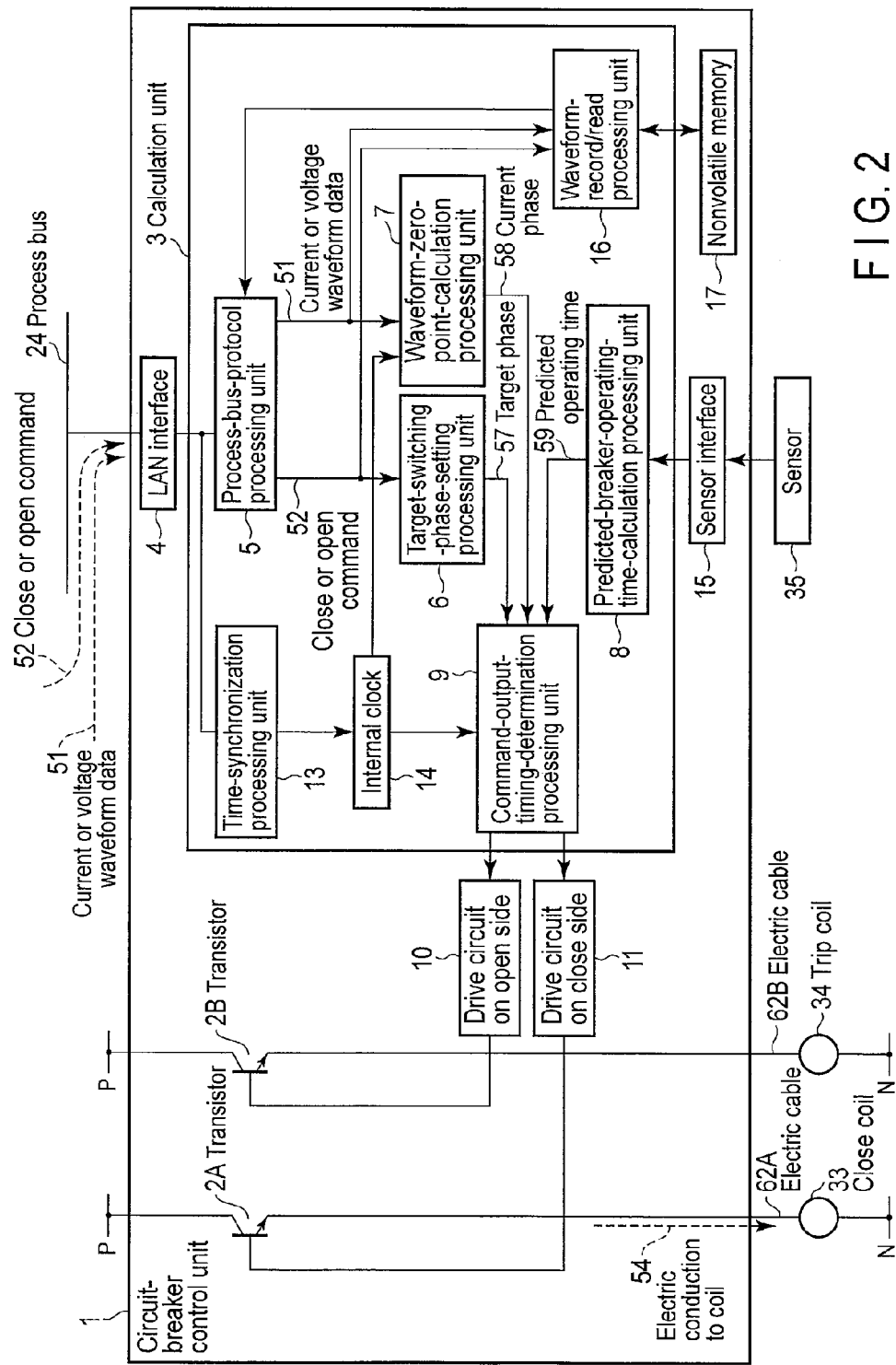
F I G. 2

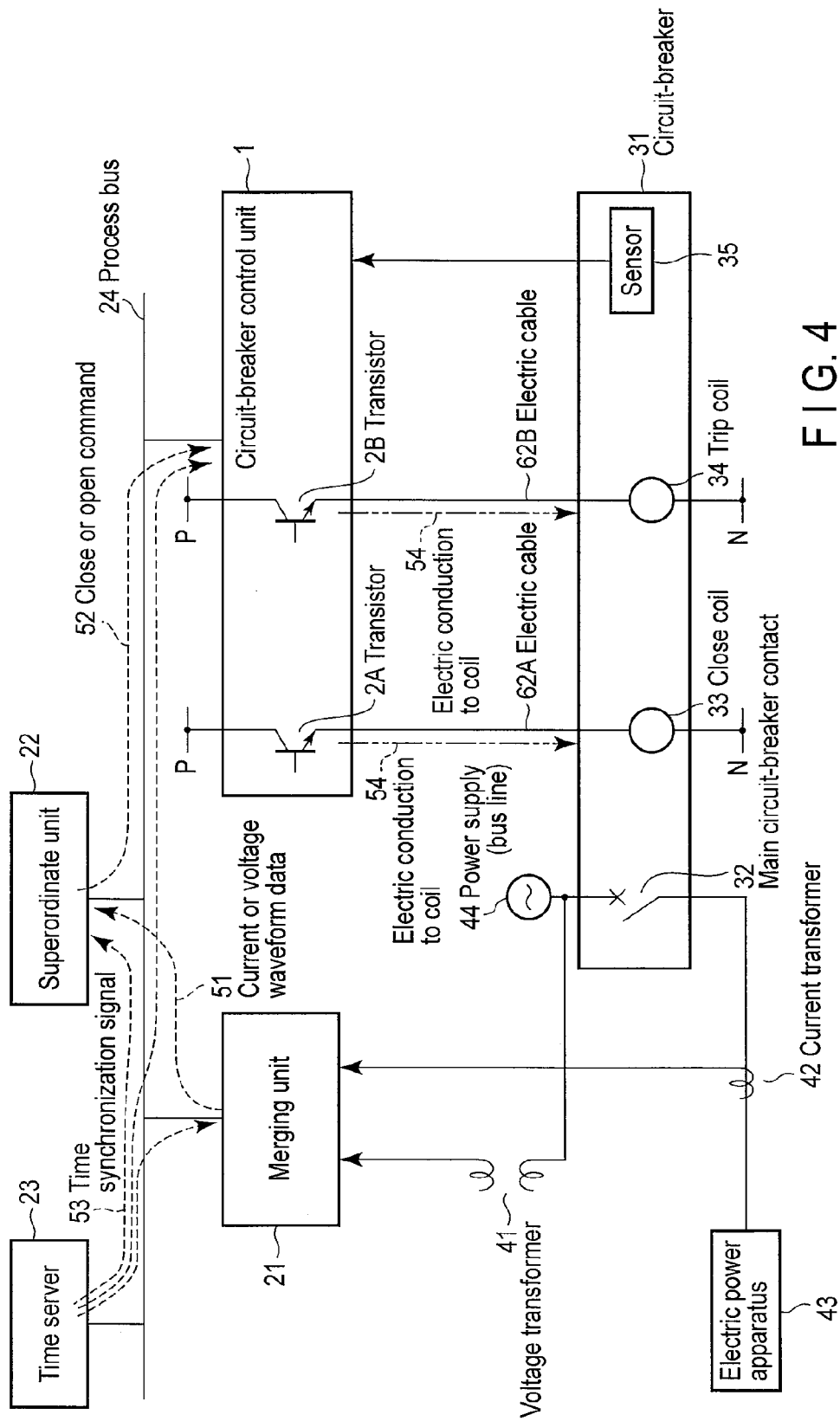
F I G. 4

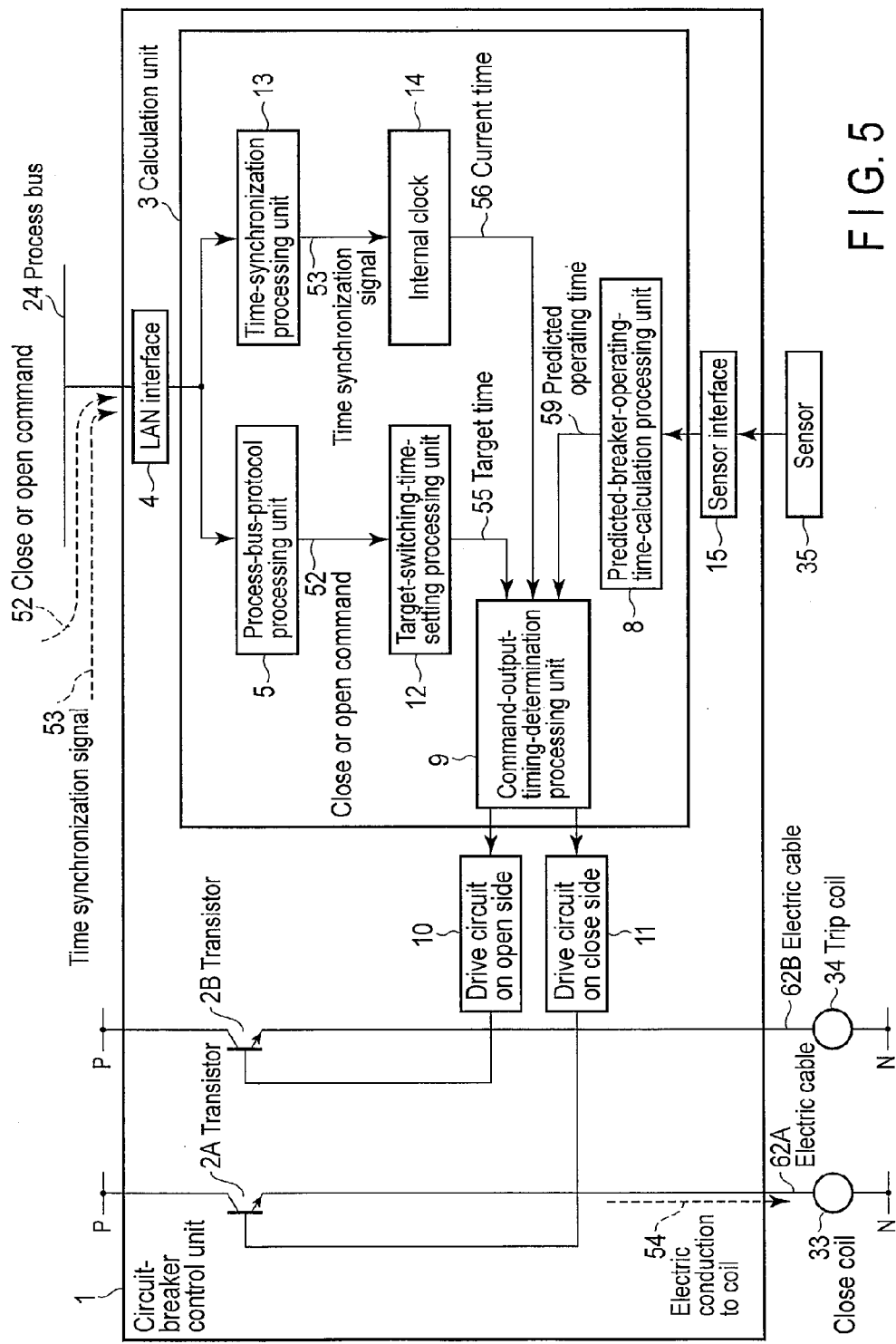
F I G. 5

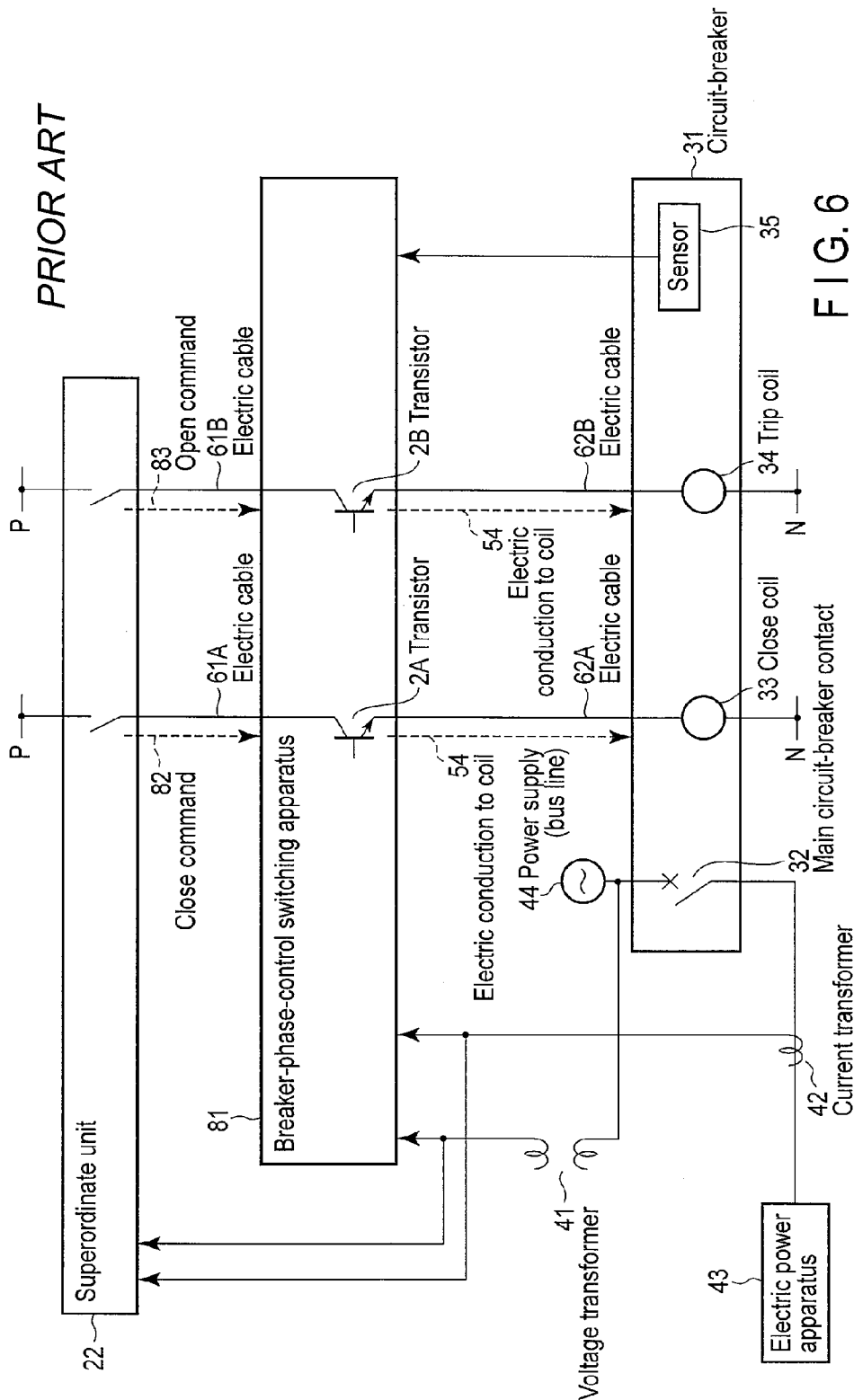
F I G. 6

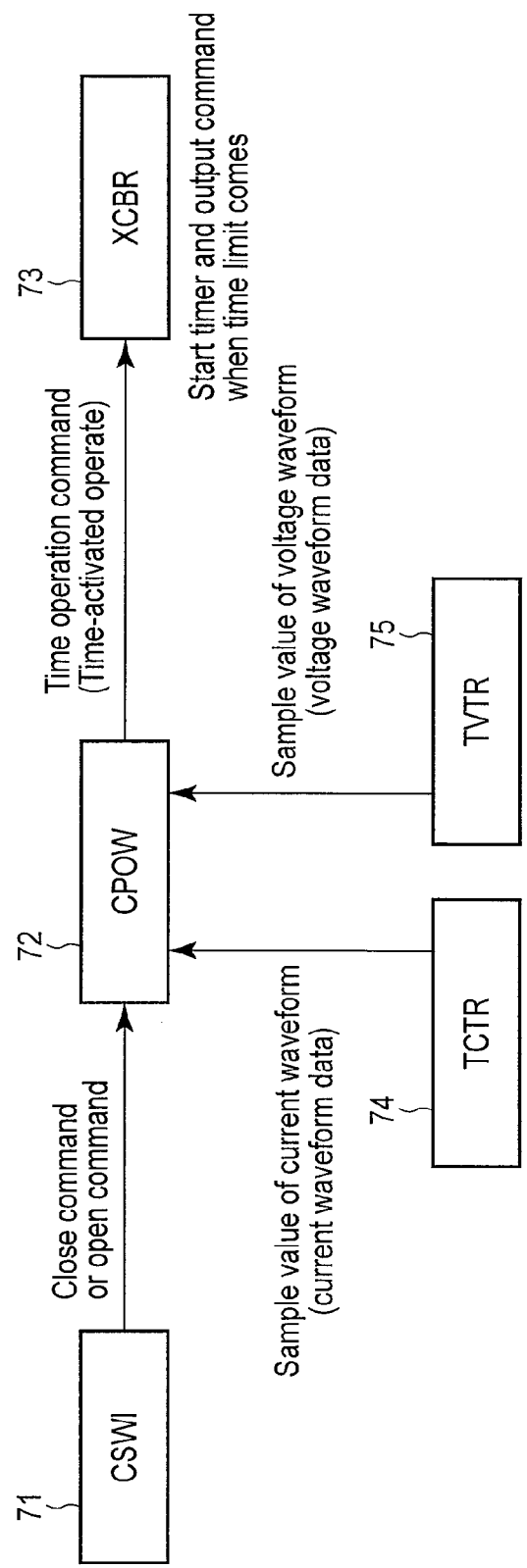
F I G. 7

BREAKER-PHASE-CONTROL SWITCHING SYSTEM AND CIRCUIT-BREAKER CONTROL UNIT

CROSS REFERENCE TO RELATED APPLICATIONS

This application is a Continuation Application of PCT Application No. PCT/JP2011/072873, filed Oct. 4, 2011 and based upon and claiming the benefit of priority from Japanese Patent Application No. 2010-227985, filed Oct. 7, 2010, the entire contents of all of which are incorporated herein by reference.

FIELD

Embodiments described herein relate generally to a breaker-phase-control switching system and a circuit-breaker control unit.

BACKGROUND

In order to practically achieve control or protection of an electric power apparatus in a transformer substation, operational conditions of apparatuses need be grasped by measuring a current or voltage waveform in a body of the electric power apparatus. In a conventional system, conversion is performed into a current value or a voltage value suitable for measurement by a transformer (a current transformer or a voltage transformer) attached to the body of the electric power apparatus. Thereafter, connection is made from the body of an electric power apparatus to a protection control apparatus which is separate from the body of the electric power apparatus, by a lot of electric cables, and waveforms are then measured.

On the other side, application of a process bus has already been started as a method of obtaining current or voltage waveform data, in accordance with development in communication and digital control technologies in recent years. In a system employing the process bus, a merging unit is provided near the electric power apparatus, and waveform signals from a plurality of transformers are once inputted into this merging unit.

The merging unit merges a plurality of waveform signals as digital data, and transmits the data to a superordinate unit, such as a guard relay or a line control unit (Bay Control Unit), by serial communication called a process bus. The superordinate unit transmits a close command or a open command for a circuit-breaker as a message on the process bus to the circuit-breaker control unit provided near the circuit-breaker.

In this manner, reduction in volume of wiring of electric cables, lightening of load on a secondary side of a transformer, and standardization of a protection control system can be achieved. In a conventional system, for example, a secondary rated current of a current transformer is standardized at 1 A or 5 A. In a similar manner to above, communication on a process bus is normalized/standardized under the IEC61850 standard, and the process bus is applied in accordance with the standard. Thereby, digital data can be shared among units of different manufacturers, i.e., interactive operation can be achieved.

There has been conventionally known a method of restricting occurrence of a transient phenomenon, which is a server burden to an electric power system or electric power apparatus, by controlling timing for close or open of a circuit-breaker. As an apparatus using the method, there is a phase control switching apparatus which controls an open timing of a main contact of a circuit-breaker at the time of opening the circuit-breaker so as to come at a target phase of a breaking current, and controls a closing timing of the main contact of the circuit-breaker at the time of closing the circuit-breaker so as to come at a target phase of a power-supply voltage waveform.

In order to cause the circuit-breaker to close or open at a target phase when a close signal or an open signal for the circuit-breaker is received, this phase control switching apparatus has a function to delay a command output timing to the circuit-breaker, i.e., a conduction start timing to a close coil or a trip coil of the circuit-breaker. Such a switching control method for a circuit-breaker is often referred to as phase control switching.

Next, an example configuration of a conventional breaker-phase-control switching method which employs a phase control switching apparatus and a process bus does not employ a process bus will be described with reference to FIG. 6. A circuit-breaker close command 82 or an open command 83 from a superordinate unit 22, such as a line control unit or a guard relay, is fed in form of a voltage as a contact signal to the breaker-phase-control switching apparatus 81 via an electric cable 61A or 61B.

The breaker-phase-control switching apparatus 81 predicts an operating time since electric conduction to a closing coil 33 or a trip coil 34 of a circuit-breaker 31 until completion of close operation or open operation of the circuit-breaker, and switches on a transistor 2A or 2B, preceding a target close phase or open phase by the predicted operating time. The close coil 33 or trip coil 34 of the circuit-breaker is thereby electrically conducted via the electric cable 62A or 62B, and the circuit-breaker 31 operates (close or open).

Though varying depending on purposes and electric power apparatuses as targets, in order to effectively achieve phase control switching, control accuracy (difference between a target phase and an actual switching phase) needs to be fall within approximately ±30 degrees including accuracy on the side of a circuit-breaker. For this purpose, variants of timing at which the breaker-phase-control switching apparatus 81 starts electrically conducting the close coil 33 or the trip coil 34 need to be sufficiently smaller than a time equivalent to phase angles of ±30 degrees.

Specifically, variants need to be within several hundred ±μs. In case of this example configuration, a current waveform from a current transformer 42, a voltage waveform from a voltage transformer 41, and electric conduction 54 to the coil of the circuit-breaker 31 reach immediately as electric signals instead of communications. Therefore, phase-control switching can be performed with high control accuracy, without considering a transfer delay of a signal or variants thereof.

On the other side, when phase-control switching is performed in a transformer-substation-protection control system which employs a process bus, waveforms and commands are transferred by communications as sample values and messages, respectively. Therefore, control accuracy is influenced by these transfer delays and variants thereof.

FIG. 7 shows conception of phase control switching provided under the IEC61850 standard. CSWI 71 expresses a function of a protection relay. CPOW 72 expresses a function of a breaker-phase-control switching apparatus. XCBR 73 expresses a function of a circuit-breaker. TCTR 74 expresses a function of a current transformer. TVTR 75 expresses a function of a voltage transformer.

Phase control switching is performed as follows. Firstly, a close command or an open command for a circuit-breaker is transmitted from CSWI 71 to CPOW 72. CPOW 72 issues a time-limit operation command (Time-activated Operate) to the circuit-breaker with reference to a current-waveform sample value from TCTR 74 or a voltage-waveform sample value from TVTR 75. XCBR 73 starts an internal timer in response to this command, and performs close operation or open operation for the circuit-breaker when the time limit comes, thereby completing phase-control switching operation. Here, a transmission delay exists when transmitting a time-limit operation command from the phase control switching apparatus to the circuit-breaker. Therefore, control accuracy is influenced.

In order to specifically describe the problem described above, an example configuration of a conventional breaker-phase-control switching system in a transformer-substation-protection control system which a process bus is applied will be described with reference to FIG. 8. In the present example configuration, the superordinate unit 22 described above has functions of logic nodes CSWI and CPOW as described above. The circuit-breaker control unit 1 has only the function of XCBR which controls the circuit-breaker 31.

The superordinate unit 22 receives current or voltage waveform data 51 (Sampled Value) transmitted by the merging unit 21 and performs control and measurement operation. The superordinate unit 22 sets a value of a timer so as to start close or open operation of the circuit-breaker 31, preceding by a predicted switching operation time for the circuit-breaker 31, and issues the close or open command 52 as a time-limit operation command for the circuit-breaker, to perform phase control switching.

The time-limit operation command is transmitted from the superordinate unit 22 to the circuit-breaker control unit 1 via the process bus 24, close or open operation is detained by delay relative to a set timer value, owing to existence of transfer delay of the close or open command.

Other data communication of current or voltage waveform data 51 than the time-limit operation command also exists on the process bus. Therefore, the transfer delay time varies depending on congestion statuses. Therefore, even if an average transfer-delay time of the time-limit operation command is corrected, a varying part of transfer delay time which depends on congestion statuses of communications appears as a drop of control accuracy.

As has been described above, the conventional breaker-phase-control switching system which employs a process bus causes a transfer delay time in communications. Since the delay time is not always constant, there is a problem that the control accuracy of close or open operation of the circuit-breaker deteriorates.

Accordingly, it is desired to provide a breaker-phase-control switching system with high control accuracy, which employs a process bus, and a circuit-breaker control unit.

BRIEF DESCRIPTION OF THE DRAWINGS

FIG. 1 shows a configuration of a breaker-phase-control switching system according to the first embodiment;

FIG. 2 shows an interior configuration of a circuit-breaker control unit 1 according to the first embodiment;

FIG. 4 shows a configuration of a breaker-phase-control switching system according to the fourth embodiment;

FIG. 5 shows an interior configuration of a circuit-breaker control unit 1 according to the second embodiment;

FIG. 6 shows a configuration of a conventional breaker-phase-switching apparatus which does not employ a process bus;

FIG. 7 is a diagram explaining conception of breaker-phase-control switching under the IEC 61850 standard.

DETAILED DESCRIPTION

Figure 3:
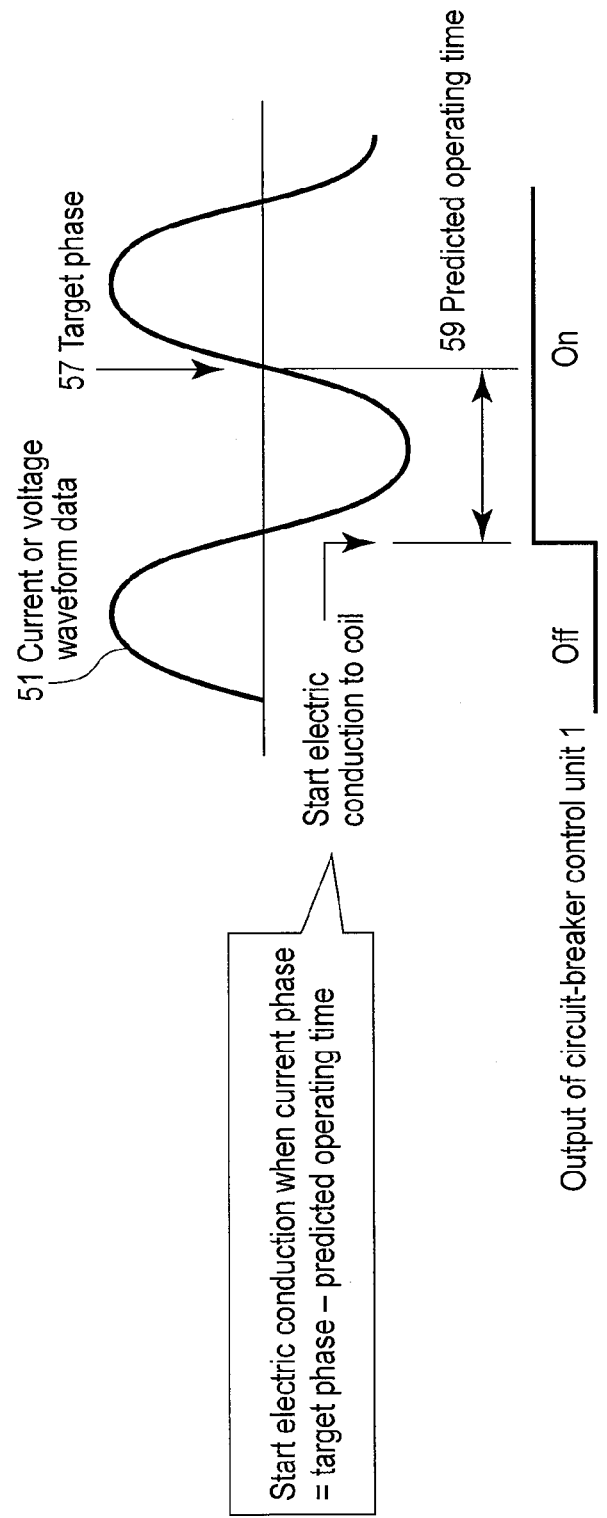
FIG. 3 is a graph explaining operation of a command-output-timing determination processor according to the first embodiment.
Figure 8:
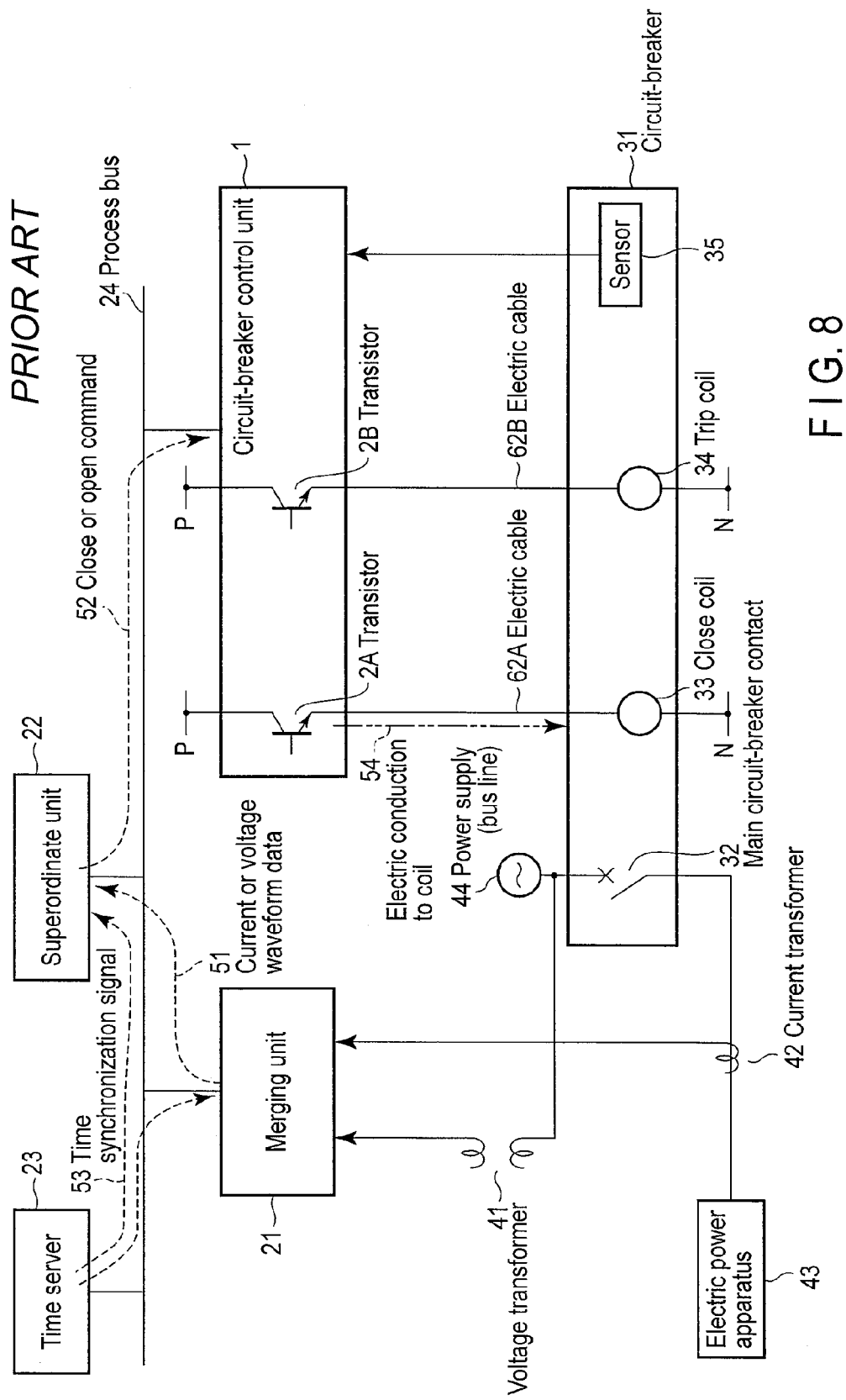
FIG. 8 shows a configuration of a conventional breaker-phase-control switching system which employs a process bus.

In general, according to one embodiment, there is provided a breaker-phase-control switching system including a merging unit configured to convert waveform data of an electric quantity of an electric power apparatus into digital data, and transmit the digital data added with time information to a process bus; a superordinate unit configured to transmit a close or an open command for a breaker to the process bus; a breaker control unit configured to electrically conduct a close coil or trip coil of the breaker, based on the waveform data and the close or open command.

The breaker control unit includes a second internal clock synchronized with a first inside clock provided in the merging unit or the superordinate unit, a waveform-zero-point-calculation processing unit configured to calculate a current phase which shows a phase at present of an input electric quantity, based on absolute time kept by the second internal clock and on the waveform data, a predicted-breaker-operating-time-calculation processing unit configured to predict a predicted operating time indicating an operating time from electrically conducting the close coil or trip coil of the breaker until close or open operation of the breaker is completed, and a command-output-timing-determination processing unit configured to determine a timing for electrically conducting the close coil or the trip coil, from the absolute time kept by the second internal clock, a preset target phase, the current phase calculated by the waveform-zero-point-calculation processing unit, and the predicted operating time predicted by the predicted-breaker-operating-time-calculation processing unit.

A breaker-phase-control switching system according to embodiments of the invention will be described with reference to the drawings.

First Embodiment

The breaker-phase-control switching system according to the present embodiment will be described with reference to FIG. 1. FIG. 1 shows a configuration of a breaker-phase-control system.

The breaker-phase-control switching system comprises a merging unit 21, a superordinate unit 22, and a circuit-breaker control unit 1, each of which is connected to a process bus 24.

The merging unit 21 is inputted with signals from a voltage of a voltage transformer 41 which measures a voltage of an electric power apparatus 43, and a current transformer 42 which measures a current. These signals are commonly inputted in a plurality in order to support measurement for three phases or a plurality of lines.

The merging unit 21 comprises an internal clock and an unillustrated analog-digital converter, samples a plurality of inputted waveform signals, merges the signals into digital data, and transmits current or voltage waveform data 51 to the process bus 24. Further, the merging unit 21 obtains a time point when sampling is performed, from the internal clock, and adds as time information to the waveform data 51 to be transmitted to the process bus 24. This time information may be a number which can be converted into a time point.

The superordinate unit 22 receives the waveform data 51 transmitted from the merging unit 21. Further, operation such as control/measurement is performed by using the waveform data 51. If close or open of the circuit-breaker 31 is determined to be required, a close or open command 52 is transmitted to the circuit-breaker control unit 1.

The circuit-breaker control unit 1 is provided near the circuit-breaker 31. A detailed interior configuration will now be described with reference to FIG. 2.

The process bus 24 is connected to the calculation unit 3 via a LAN interface 4 inside the circuit-breaker control unit 1. On the other side, a sensor 35 is connected to the calculation unit 3 via a sensor interface 15.

The calculation unit 3 comprises a time-synchronization processing unit 13, an internal clock 14, a process-bus-protocol processing unit 5, a target-switching-phase-setting processing unit 6, a waveform-zero-point-calculation processing unit 7, a predicted-breaker-operation-time-calculation processing unit 8, a command-output-timing-determination processing unit 9, and a waveform-record/read processing unit 16.

Firstly, the time synchronization processor 13 receives a time synchronization signal via the process bus from the merging unit 21, and synchronizes an internal clock kept by the internal clock 14 at least with internal time of the merging unit 21. This synchronization is performed at a frequency not lower than a required synchronization frequency which is determined by accuracy of the internal clock 14, and requested accuracy of synchronous switching. The time-synchronization processing unit 13 may operate, for example, in accordance with either the IEEE1588 protocol or any other protocol, or may be configured to receive an unillustrated time synchronization signal which does not pass through the process bus.

The process-bus-protocol processing unit 5 feeds the current or voltage waveform data 51 to voltage waveform-zero-point-detection processing 7, and feeds the close or open command 52 to the target-switching-phase-setting processing unit 6.

The target-switching-phase-setting processing unit 6 receives the close or an open command 52, and notifies the command-output-timing determination processing 9 of the target phase 57 expressing a target phase at which the circuit-breaker 31 is closed or opened. This target phase 57 includes information indicating whether the circuit-breaker is to be closed or opened. In addition, specification data including the target phase 57 and a waveform as a reference thereof are set in advance by directly operating the circuit-breaker control unit 1, or can be set through the process bus 24 from the superordinate unit 22 or an unillustrated human interface.

For example, in case of closing a system of a no-load transformer, an optimal close phase differs depending on sizes of residual magnetic flux of a transformer core at each phase. Thus, when the optimal close phase or an open phase varies depending on statuses of an electric power apparatus, a target phase is set each time from the superordinate unit 22.

The waveform-zero-point-calculation processing unit 7 receives the waveform data 51 and notifies the command-output-timing determination processing 9 of the current phase 58 expressing a current phase.

The predicted-breaker-operating-time-calculation processing unit 8 receives an ambient temperature, a control voltage, and an operation pressure from the sensor interface 15, and notifies the command-output-timing determination processing 9 of a predicted operating time 59 since electric conduction to a close coil or a trip coil until completion of close operation or open operation, based on values thereof. Here, the predicted operating time 59 until completion of close operation or open operation of the circuit-breaker is a predicted operating time from starting electric conduction to the close coil 33 of the circuit-breaker 31 until electric connection to the main circuit-breaker contact 32 in case of a close command, or is a predicted operating time from starting electric conduction to the trip coil 34 of the circuit-breaker 31 until mechanical isolation of the main circuit-breaker contact 32 in case of an open command. These are influenced by the operation pressure, ambient temperature, and control voltage of the circuit-breaker 31.

The command-output-timing-determination processing unit 9 determines a timing for starting electric conduction to the close coil 33 or trip coil 34, from absolute time kept by the internal clock 14, the target phase 57, the current phase 58, and the predicted operating time 59, and outputs a command for starting driving to applicable one of a drive circuit 10 on the open side and a drive circuit 11 on the close side. At this time, the command for starting driving is outputted to the drive circuit 11 on the close side if information of closing the circuit-breaker 31 is included in the target phase 57, or is outputted to the drive circuit 10 on the open side if information of opening the circuit-breaker 31 is included.

The drive circuit 10 on the open side is connected to a base of a transistor 2B, and controls ON/OFF of the transistor 2B. An emitter of the transistor 2B is connected to the trip coil 34 via an electric cable 62B. The drive circuit 11 on the close side is configured in the same manner as above.

The calculation unit 3 comprises a waveform-record/read processing unit 16, and records, into the nonvolatile memory 17, the waveform data 51 of a current or voltage for a constant period before and after a time limit of a time-limit operation command based on the close or open command 52. In addition, the waveform-record/read processing unit 16 transmits the recorded waveform data 51 via the process bus 24 upon request from the superordinate unit 22 or an unillustrated human interface.

Operation of the breaker-phase-control switching system configured as above will now be described below.

The merging unit 21 performs analog/digital conversion on voltage and current waveforms from the voltage transformer 41 and the current transformer 42, and merges the waveforms into digital data added with time information. The merging unit 21 transmits the current or voltage waveform data 51 to the process bus 24 at a sampling frequency defined under a standard.

The superordinate unit 22, such as a line control unit or a protection relay, receives the waveform data 51, and performs control/measurement operation or protection operation with use of the waveform data 51. If the circuit-breaker 31 needs to be closed or opened, the superordinate unit 22 transmits the close or open command 52 for the circuit-breaker 31 to the circuit-breaker control unit 1 via the process bus 24.

The target-switching-phase-setting processing unit 6 in the circuit-breaker control unit 1 notifies the command-output-timing-determination processing unit 9 of the target phase 57 in response to the close or open command 52 for the circuit-breaker 31.

The waveform-zero-point-calculation processing unit 7 receives the current or voltage waveform data 51 on the process bus 24 and notifies the command-output-timing-determination processing unit 9 of the value of the current phase. Time information has been added to the waveform data 51 by the merging unit 21, and the current phase 58 is calculated by referring to a sample time of the waveform data 51 obtained herefrom and the current time of the internal clock 14. Since waveform data is constantly fed from the merging unit 21, the waveform-zero-point-calculation processing unit 7 constantly predicts a zero phase point of the reference waveform to be a reference for phase control switching, irrespective of presence/absence of the close or open command 52 for the circuit-breaker 31.

The predicted-breaker-operating-time-calculation processing unit 8 notifies the command-output-timing determination processing unit 9 of the predicted operating time 59 corrected as described above.

The command-output-timing determination processing 9 determines a timing of starting electric conduction to the close coil 33 or trip coil 34, and outputs a command for starting driving to applicable one of a drive circuit 10 on the open side or a drive circuit 11 on the close side. Specifically, where a close or open command has been received from a superordinate unit, a drive command is outputted to an applicable circuit if the following is satisfied:

Current Phase 58=Target Phase 57−Predicted Operating Time 59 equivalent to a phase angle FIG. 3 shows this relationship.

By the drive command, the drive circuit 10 on the open side or the drive circuit 11 on the close side is made operate. The transistor 2B or 2A thereby turns on, starting electric conduction to the trip coil 34 or the close coil 33 via the electric cable 62B or 62A. The units can be manufactured in a manner that a delay time in this process falls within several hundred μs. The circuit-breaker starts operating upon start of electric conduction, and switching of the main circuit-breaker contact 32 is completed at the target phase 57 after the operating time 59.

The current or voltage waveform data 51 for a constant period before and after a time limit as a trigger of the time-limit operation command recorded on the nonvolatile memory 17a can be used for reading from the superordinate unit 22 and for success/failure determination of phase control switching or evaluation of control accuracy.

Effects of the breaker-phase-control switching system according to the present embodiment will be described.

Firstly, the circuit-breaker control unit 1 is provided with the phase control switching function CPOW. A timing for time limit operation is determined by the circuit-breaker control unit 1. The electric conduction 54 is made to a coil through the electric cable 62A about which a transfer delay needs not be considered. Therefore, transfer of the time-limit operation command via the process bus 24 is not required, and influence from a transfer delay can be avoided.

Secondarily, the circuit-breaker control unit 1 extracts a reference waveform as a reference for phase control switching from the waveform data 51 which is constantly fed from the merging unit 21, and constantly predicts a phase zero point. Therefore, when the close or open command 83 is received, phase control switching with a shorter delay time can be achieved without waiting for arrival of a required number of waveform data samples.

Thirdly, the function of recording waveform data at the time of phase control switching, which can be used for the success/failure determination of phase control switching or evaluation of control accuracy, can be achieved without special additional hardware.

Second Embodiment

A configuration of a breaker-phase-control switching system according to the present embodiment will now be described with reference to FIG. 4. In FIG. 4, a superordinate unit 22 has the function of CPOW in addition to the function of CSWI, and a circuit-breaker control unit 1 has the function of XCBR.

The configuration of the present embodiment differs from the first embodiment in that a time server 23 is connected to a process bus 24. In a breaker-phase-control switching system, a merging unit 21, the superordinate unit 22, and the circuit-breaker control unit 1 each comprise an internal clock. A time synchronization signal 53 from the time server 23 is configured to be distributed to each of the foregoing units, so as to allow the internal clocks of the units to be synchronous with the one same time.

The superordinate unit 22 receives waveform data 51, performs control/measurement operation by using this data, and transmits a close or open command 52 to the process bus 24, preceded by a switching operation time of the circuit-breaker 31. Since this waveform data 51 is constantly fed from the merging unit 21, the superordinate unit 22 constantly predicts a phase zero point of a reference waveform to be a reference for phase control switching, irrespective of presence/absence of the close or open command for the circuit-breaker 31.

Here, if the circuit-breaker 31 needs to be closed or opened, the close or open command 52 is transmitted to the circuit-breaker control unit 1, as a time-limit operation command which is added with a target time to open/close the circuit-breaker 31. In addition, specification information such as a target phase required to calculate the target time and a waveform as a reference thereof can be set in advance by directly operating the superordinate unit 22, or can be set through the process bus 24 from an unillustrated human interface or a different communication path such as a station bus.

Next, the circuit-breaker control unit 1 will be described focusing on difference from the first embodiment with reference to FIG. 5. The same configuration components as those of the first embodiment will be denoted respectively at the same reference symbols, and descriptions thereof will be omitted.

FIG. 5 shows the internal configuration of the circuit-breaker control unit 1. Difference from the first embodiment is that the waveform-zero-point-calculation processing unit 7, waveform record/read processing unit 16, and nonvolatile memory 17 are omitted, and a target-switching-time-setting processing unit 12 is comprised in place of a target-switching-phase-setting processing unit 6.

A LAN interface 4 transfers the close or open command 52 to the target-switching-time-setting processing unit 12, and also transfers the time synchronization signal 53 to the time-synchronization processing unit 13.

The target-switching-time-setting processing unit 12 extracts a target time 55 from the close or open command 52 received as a time-limit operation command, and notifies a command-output-timing determination processing 9 of the target time 55.

The time-synchronization processing unit 13 synchronizes the internal clock 14 with the same time as the time server 23, based on the time synchronization signal 53 from the process bus 24. Synchronization is performed at a frequency not lower than a required synchronization frequency which is determined by accuracy of the internal clock 14 and a synchronous-switching request accuracy. The time-synchronization processing unit 13 may operate, for example, in accordance with either IEEE1588 protocol or any other protocol, or may be configured to receive an unillustrated time synchronization signal which does not pass through the process bus 24.

The internal clock 14 notifies the command-output-timing-determination processing unit 9 of the current time 56 kept in itself.

The predicted-breaker-operating-time-calculation processing unit 8 receives an operation pressure, an ambient temperature, and a control voltage of the circuit-breaker 31 from a sensor interface 15, and notifies the command-output-timing-determination processing unit 9 of the operating time 59 which is corrected based on values thereof.

The command-output-timing-determination processing unit 9 determines a timing of starting electric conduction to the close coil 33 or trip coil 34, from a target time 55, the current time 56, and the predicted operating time 59, and outputs a drive command indicating start of driving to applicable one of a drive circuit 10 on the open side and a drive circuit 11 on the close side.

Operation of the breaker-phase-control switching system based configured as above will be described below.

The process-bus-protocol processing unit 5 in the circuit-breaker control unit 1 transfers the close or open command 52 to the target-switching-time-setting processing unit 12. The target switching-time-setting processing unit 12 extracts the target time 55 from the time-limit operation command, and notifies the command-output-timing determination processing unit 9 of the target time 55.

The internal clock 14 notifies the command-output-timing-determination processing unit 9 of the current time 56. The internal clock 14 synchronizes with the time server 23, and therefore keeps the same time as the superordinate unit 22 within a tolerance. Accordingly, the target time 55 calculated by the superordinate unit 22 is applicable directly to processing by the circuit-breaker control unit 1.

The predicted-breaker-operating-time-calculation processing unit 8 receives an operation pressure, an ambient temperature, a control voltage of the circuit-breaker 31, and the like from a sensor interface 15, and notifies the command-output-timing-determination processing unit 9 of the predicted operating time 59 which is corrected based on values thereof. These values are peculiar to breaker phase control, and are therefore processed within the circuit-breaker control unit 1.

The command-output-timing-determination processing unit 9 determines a timing of starting electric conduction to the close coil 33 or trip coil 34, and outputs a drive command to applicable one of a drive circuit 10 on the open side and a drive circuit 11 on the close side. Specifically, where a close or open command has been received from a superordinate unit, a drive command is outputted to an applicable circuit if the following is satisfied:

Current time 56=Target time 55−predicted operating time 59

Effects of the breaker-phase-control switching system according to the present embodiment will be described.

Firstly, the close or open command 52 is transmitted to the circuit-breaker control unit 1 in form of a time-limit operation command which is added with the target time 55 to open/close the circuit-breaker 31. In this manner, transfer delay of the process bus 24 can be prevented from influencing a switching timing in comparison with a conventional system which transmits the time-limit operation command specifying a timer value. Therefore, influence of transfer delay is avoidable. In the present embodiment, the current or voltage waveform processing on real time in the circuit-breaker control unit 1 is not required. Therefore, burden on the calculation unit 3 in the same unit is not greatly increased.

Secondarily, the superordinate unit 22 extracts a reference waveform as a reference for phase control switching from the waveform data which is constantly fed from the merging unit 21, and constantly predicts a phase zero. Therefore, when the close or open command 52 is received, a target time can be specified with a shorter delay time without waiting for arrival of a required number of waveform data samples.

The superordinate unit 22 of the present embodiment transmits the time-limit operation command specifying a time to the circuit-breaker control unit 1. However, a time-limit operation command specifying a phase angle may alternatively be transmitted to the circuit-breaker control unit 1. In this case, an example configuration of the circuit-breaker control unit 1 is the same configuration as shown in FIG. 2 of the first embodiment.

As described above, an optimal close phase or open phase may vary depending on statuses of an electric power apparatus. In this case, the superordinate unit 22 calculates the optimal close phase or open phase. A phase angle is specified for the circuit-breaker control unit 1 from the superordinate unit 22 to process bus 24.

By such a time-limit operation command which specifies a phase angle, influence of transfer delay can be avoided. Further, the circuit-breaker control unit can perform flexible phase control switching in accordance with status change by specifying a phase angle. For example, even if the time-limit operation command is not in time, circuit-breaker switching operation is performed at the same phase angle in the next cycle of a current or voltage, or circuit-breaker switching operation is performed in correspondence with frequency changes after output of a time-limit operation command.

According to the embodiments of the invention, it is possible to provide a breaker-phase-control switching system with high control accuracy, which employs a process bus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A breaker-phase-control switching system, comprising:
a merging unit configured to convert waveform data of an electric quantity of an electric power apparatus into digital data, and transmit the digital data added with time information to a process bus;
a superordinate unit configured to transmit a close or an open command for a circuit-breaker to the process bus;
a circuit-breaker control unit configured to electrically conduct a close coil or trip coil of the circuit-breaker, based on the waveform data and the close or open command, wherein
the circuit-breaker control unit comprises
a second internal clock synchronized with a first inside clock provided in the merging unit or the superordinate unit,
a waveform-zero-point-calculation processing unit configured to calculate a current phase which shows a phase at present of an input electric quantity, based on absolute time kept by the second internal clock and on the waveform data,
a predicted-breaker-operating-time-calculation processing unit configured to predict a predicted operating time indicating an operating time from electrically conducting the close coil or trip coil of the circuit-breaker until close or open operation of the circuit-breaker is completed, and a command-output-timing-determination processing unit configured to determine a timing for electrically conducting the close coil or the trip coil, from the absolute time kept by the second internal clock, a preset target phase, the current phase calculated by the waveform-zero-point-calculation processing unit, and the predicted operating time predicted by the predicted-breaker-operating-time-calculation processing unit.

2. The breaker-phase-control switching system, according to claim 1, wherein
the preset target phase is set through the process bus from the superordinate unit or a human interface.

3. A breaker-phase-control switching system, comprising:
a merging unit configured to convert waveform data of an electric quantity of an electric power apparatus into digital data, and transmit the digital data added with time information to a process bus;
a superordinate unit configured to transmit a close or an open command for a circuit-breaker to the process bus;
a circuit-breaker control unit configured to electrically conduct a close coil or a trip coil of the circuit-breaker, based on the waveform data and the close or open command; and
a time server for transmitting synchronization time information to the process bus, wherein
the superordinate unit is configured to calculate a time point equivalent to a phase in which the circuit-breaker is closed or opened, based on absolute time kept by a first internal clock and on the waveform data, and transmit a close command or an open command added with time information based on the calculated time point, and
the circuit-breaker control unit comprises
a second internal clock synchronized with absolute time which is kept by the time server, based on the synchronization time information received from the time server,
a predicted-breaker-operating-time calculation processing unit configured to predict a predicted operating time indicating an operating time from electrically conducting the close coil or trip coil of the circuit-breaker until close or open operation of the circuit-breaker is completed, and
a command-output-timing-determination processing unit configured to determine a timing to electrically conducting the close coil or the trip coil, from current time kept by the second internal clock, the time information added to the close or open command received from the superordinate unit, and the predicted operating time predicted by the predicted-breaker-operating-time-calculation processing unit.

4. The breaker-phase-control switching system, according to claim 3, wherein
the superordinate unit is configured to transmit the close command or open command added with phase information indicating the phase at which the circuit-breaker is closed or opened, without calculation of the time point equivalent to the phase at which the circuit-breaker is closed or opened and addition of time information based on the calculated time point to the close or open command, and
the command-output-timing-determination processing unit of the circuit-breaker control unit is configured to determine a timing for electrically conducting the close coil or the trip coil, from the current time kept by the second internal clock, the phase information added to the close or open command received from the superordinate unit, and the predicted operating time predicted by the predicted-breaker-operating-time-calculation processing unit.

5. The breaker-phase-control switching system, according to claim 1, wherein
the circuit-breaker control unit is configured to receive the waveform data from the merging unit and predict a phase-zero time point in a reference waveform, irrespective of presence or absence of the close command or open command.

6. The breaker-phase-control switching system, according to claim 4, wherein
the circuit-breaker control unit is configured to receive the waveform data from the merging unit and predict a phase-zero time point in a reference waveform, irrespective of presence or absence of the close command or open command.

7. The breaker-phase-control switching system, according to claim 3, wherein
the superordinate unit is configured to receive the waveform data from the merging unit and predict a phase-zero time point in a reference waveform, irrespective of presence or absence of the close command or open command.

8. The breaker-phase-control switching system, according to claim 1, wherein
the circuit-breaker control unit is configured to record the waveform data for a constant period before and after, as a reference, a time point of receiving the command or a specific time point relating to the command, when a close command or an open command for the circuit-breaker is received.

9. The breaker-phase-control switching system, according to claim 3, wherein
the circuit-breaker control unit is configured to record the waveform data for a constant period before and after, as a reference, a time point of receiving the command or a specific time point relating to the command, when a close command or an open command for the circuit-breaker is received.

10. The breaker-phase-control switching system according to claim 8, wherein
the circuit-breaker control unit is configured to output the recorded waveform data to the superordinate unit or any other apparatus.

11. The breaker-phase-control switching system according to claim 9, wherein
the circuit-breaker control unit is configured to output the recorded waveform data to the superordinate unit or any other apparatus.

12. A circuit-breaker control unit provided in a breaker-phase-control switching system including a merging unit configured to convert waveform data of an electric quantity of an electric power apparatus into digital data, and transmit the digital data added with time information to a process bus, and a superordinate unit configured to transmit a close or an open command for a circuit-breaker to the process bus, to electrically conduct a close coil or trip coil of the circuit-breaker, based on the waveform data and the close or open command, the circuit-breaker control unit comprising:
a second internal clock synchronized with a first internal clock provided in the merging unit or the superordinate unit;
a waveform-zero-point-calculation processing unit configured to calculate a current phase which shows a phase at present of an input electric quantity, based on absolute time which the second internal clock keeps and the waveform data;

a predicted-breaker-operating-time-calculation processing unit configured to predict a predicted operating time indicating an operating time from electrically conducting the close coil or trip coil of the circuit-breaker until close or open operation of the circuit-breaker is completed; and a command-output-timing-determination processing unit configured to determine a timing for electrically conducting the close coil or the trip coil, from the absolute time kept by the second internal clock, a preset target phase, the current phase calculated by the waveform-zero-point-calculation processing unit, and the predicted operating time predicted by the predicted-breaker-operating-time-calculation processing unit.

13. The circuit-breaker control unit according to claim 12, wherein
the preset target phase is set through the process bus from the superordinate unit or a human interface.

14. A circuit-breaker control unit provided in a breaker-phase-control switching system including a merging unit configured to convert waveform data of an electric quantity of an electric power apparatus into digital data, and transmit the digital data added with time information to a process bus, a superordinate unit configured to calculate a time point equivalent to a phase for closing or opening a circuit-breaker, based on absolute time kept by a first internal clock and on the waveform data, and transmit to the process bus a close command or an open command for the circuit-breaker added with time information based on the calculated time point, to electrically conduct the close coil or trip coil of the circuit-breaker, based on the waveform data and the close command or open command, the circuit-breaker control unit comprising:

a second internal clock synchronized with absolute time kept by the time server, based on synchronization time information received from the time server;

a predicted-breaker-operating-time-calculation processing unit configured to predict a predicted operating time indicating operating time from electrically conducting the close coil or trip coil of the circuit-breaker until close or open operation of the circuit-breaker is completed, and a command-output-timing-determination processing unit configured to determine a timing for electrically conducting the close coil or the trip coil, from current time kept by the second internal clock, the time information added to the close or open command received from the superordinate unit, and the predicted operating time predicted by the predicted-breaker-operating-time-calculation processing unit.

15. The circuit-breaker control unit according to claim 14, further comprising
a unit configured to receive from the superordinate unit the close command or open command added with phase information indicating a phase at which the circuit-breaker is closed or opened, without calculation of the time point equivalent to the phase in which the circuit-breaker is closed or opened and addition of the time information based on the calculated time point to the close or open command, wherein
the command-output-timing-determination processing unit is configured to determine a timing for electrically conducting the close coil or the trip coil, from the current time kept by the second internal clock, the phase information added to the close or open command received from the superordinate unit, and the predicted operating time predicted by the predicted-breaker-operating-time-calculation processing unit.

16. The circuit-breaker control unit according to claim 12, further comprising
a unit configured to receive the waveform data from the merging unit and predict a phase-zero time point in a reference waveform, irrespective of presence or absence of the close command or open command.

17. The circuit-breaker control unit according to claim 15, further comprising
a unit configured to receive the waveform data from the merging unit and predict a phase-zero time point in a reference waveform, irrespective of presence or absence of the close command or open command.

18. The circuit-breaker control unit according to claim 12, comprising
a unit configured to record the waveform data for a constant period before and after, as a reference, a time point of receiving the command or a specific time point relating to the command, when the close command or open command for the circuit-breaker is received.

19. The circuit-breaker control unit according to claim 14, comprising
a unit configured to record the waveform data for a constant period before and after, as a reference, a time point of receiving the command or a specific time point relating to the command, when the close command or open command for the circuit-breaker is received.

20. The circuit-breaker control unit according to claim 18, comprising
a unit configured to output the recorded waveform data, to the superordinate unit or any other apparatus.

21. The circuit-breaker control unit according to claim 19, comprising
a unit configured to output the recorded waveform data, to the superordinate unit or any other apparatus.

* * * * *